United States Patent
Zhou et al.

(10) Patent No.: US 8,867,925 B2
(45) Date of Patent: Oct. 21, 2014

(54) REDUCING ELECTRICAL CURRENT OF A SIGNAL DRIVER FOR AN OPTICAL TRANSMITTER

(75) Inventors: Dacheng Zhou, Fort Collins, CO (US); Daniel Alan Berkram, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 132 days.

(21) Appl. No.: 13/554,246

(22) Filed: Jul. 20, 2012

(65) Prior Publication Data

US 2014/0023379 A1    Jan. 23, 2014

(51) Int. Cl.
*H04B 10/04* (2006.01)
*H04B 10/12* (2006.01)
*H04B 10/06* (2006.01)

(52) U.S. Cl.
USPC ............................. 398/182; 398/183; 398/202

(58) Field of Classification Search
CPC ... H04B 10/516; H04B 10/541; H04B 10/564
USPC ........................................................ 398/182
See application file for complete search history.

(56) References Cited

U.S. PATENT DOCUMENTS

| | | | |
|---|---|---|---|
| 5,889,604 A * | 3/1999 | Hayashi | 398/192 |
| 6,947,456 B2 | 9/2005 | Chin | |
| 2003/0061390 A1 * | 3/2003 | Schaller et al. | 709/248 |
| 2004/0120717 A1 * | 6/2004 | Clark et al. | 398/118 |
| 2004/0223767 A1 * | 11/2004 | Pappalardo et al. | 398/183 |
| 2004/0264959 A1 * | 12/2004 | Siepmann | 398/45 |
| 2005/0111501 A1 * | 5/2005 | Chieng et al. | 372/29.02 |
| 2005/0281562 A1 * | 12/2005 | Pappalardo et al. | 398/183 |
| 2007/0098415 A1 * | 5/2007 | Lupo et al. | 398/197 |
| 2011/0002377 A1 | 1/2011 | Raveendran | |
| 2011/0013912 A1 * | 1/2011 | Kalberer et al. | 398/115 |

FOREIGN PATENT DOCUMENTS

WO    W02008/119669    10/2008

OTHER PUBLICATIONS

Gui, Ping, Dissertation to the University of Delaware, Design and System Integration of Power-Efficient Gigabit Parallel Optical Links for Computer Communication, 2004 (132 pages).
Chen et al., IEEE, 2005, Exploring the Design Space of Power-Aware Opto-Electronic Networked Systems (12 pages).
Palaniappan et al., IEEE, 2010, Power Efficiency Comparisons of Interchip Optical Interconnect Architectures (5 pages).
Wikipedia, Vertical-cavity surface-emitting laser, May 2012 (5 pages).

* cited by examiner

*Primary Examiner* — David Payne
*Assistant Examiner* — Casey Kretzer

(57) ABSTRACT

Data for transmission by an optical transmitter that is driven by a signal driver is encoded, where the encoding is according to a criterion that specifies a reduction of an aggregate electrical current of the signal driver.

14 Claims, 5 Drawing Sheets

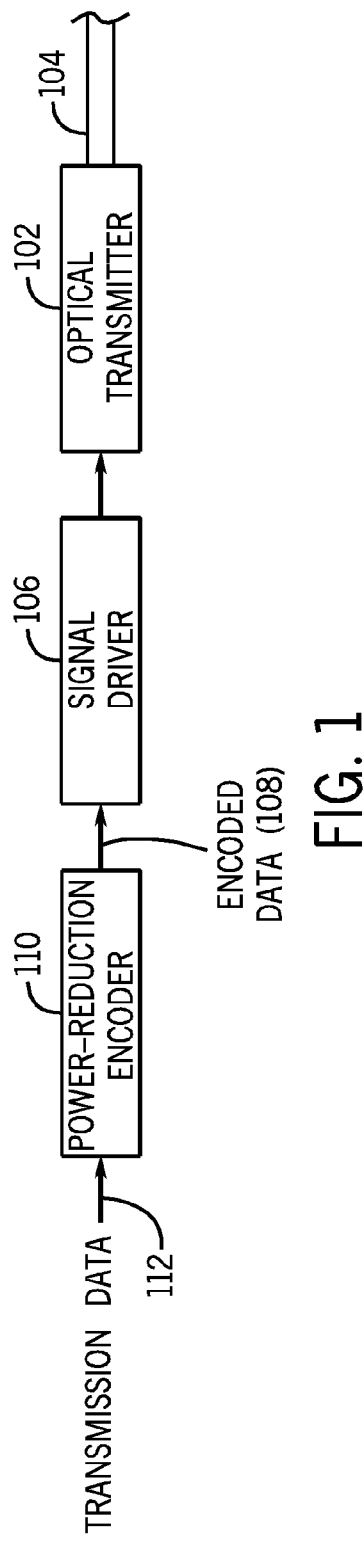

REDUCING ELECTRICAL CURRENT OF A SIGNAL DRIVER FOR AN OPTICAL TRANSMITTER

BACKGROUND

A system can include various devices (e.g. processors, storage devices, input/output (I/O) devices, computers, server blades, etc.) that are interconnected by a network fabric. To achieve higher bandwidth, a network fabric can include optical links over which optical signals can be communicated.

BRIEF DESCRIPTION OF THE DRAWINGS

Some embodiments are described with respect to the following figures:

FIG. 1 is a block diagram of components in an example electronic device, which implements power management mechanisms or techniques according to some implementations;

FIG. 2 illustrates examples of transmission data and encoded data encoded according to some implementations;

FIG. 3 illustrates a data packet according to some implementations;

DETAILED DESCRIPTION

Figure 4:
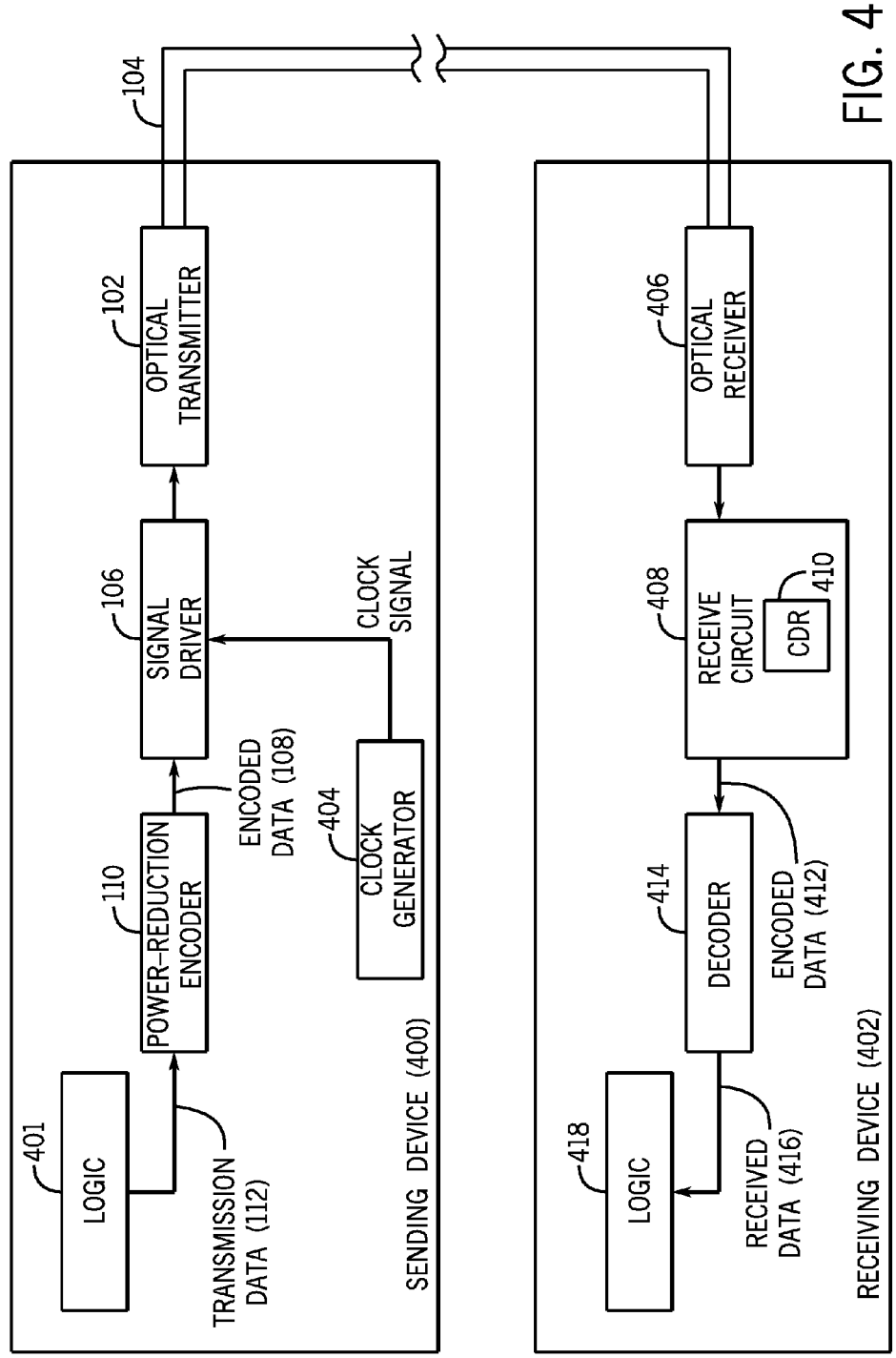
FIG. 4 is a block diagram of components in an example sending device and an example receiving device, according to some implementations.

To perform optical communications over an optical link (which can be an optical fiber, an optical waveguide, etc.), an optical transmitter at a sending device sends optical signals over the optical link for receipt by an optical receiver at a receiving device. The sending and receiving devices can be electronic devices, such as computers, storage devices, processors, input/output (I/O) devices, and so forth. More generally, electronic devices that are coupled by an optical link can each have a respective optical transceiver, which includes an optical transmitter and an optical receiver. In some examples, an optical transmitter can include a laser diode or other type of light emitting component. In more specific examples, a type of laser diode is a semiconductor laser diode, such as a vertical-cavity surface-emitting laser (VCSEL), which is able to emit a laser in a direction that is generally perpendicular to the surface of the VCSEL. In other examples, other types of optical transmitters can be employed.

In the ensuing discussion, although reference is made to VCSELs, it is noted that techniques or mechanisms according to various implementations can be applied to other types of optical transmitters.

An optical transmitter such as a VCSEL can be controlled by an electrical signal driver, which produces an electrical current (referred to as an "electrical driver current") that is provided to the optical transmitter. Provision of the electrical driver current to the optical transmitter stimulates the optical transmitter to cause the optical transmitter to emit light. An optical transmitter such as a VCSEL is activated when the electrical driver current is above a predefined threshold. However, if the electrical driver current is less than the predefined threshold, then the optical transmitter such as a VCSEL is deactivated (off). Effectively, an optical transmitter converts an electrical signal (such as in the form of the electrical driver current) to an optical signal that is communicated over an optical link.

The reliability and/or lifetime of an optical transmitter such as a VCSEL is related to the average electrical driver current, output by the signal driver, that is provided to the optical transmitter. Generally, a higher average electrical driver current can result in reduced reliability and/or lifetime of the VCSEL.

Moreover, a higher electrical driver current can also lead to an increased operating temperature of the VCSEL. The increased operating temperature can result in a reduced electrical-to-optical conversion rate by the VCSEL, which in turn means that to achieve a target data rate of communications over an optical link, a higher average electrical driver current may have to be output from the signal driver to maintain the requisite optical power to achieve the target data rate. Having to increase the average electrical driver current to achieve the target data rate can in turn lead to further reduced reliability and/or lifetime of the VCSEL.

Reliability and/or lifetime reduction issues can also be present at an optical receiver, such as a photo diode or other type of photo detector. The photo diode or other photo detector converts received optical signals into electrical signals, which are then provided to electrical circuitry for processing. An optical signal that is produced in response to a relatively high electrical driver current at the sending device can result in an operating point of the optical receiver that corresponds to the relatively high electrical driver current. This can also lead to reduced reliability and/or lifetime of the optical receiver.

In according with some implementations, to reduce the average electrical driver current output from a signal driver to an optical transmitter such as a VCSEL, data encoding is applied to transmission data according to a power-reduction criterion that specifies a reduction of an average electrical driver current of the signal driver.

The average electrical driver current is determined by taking the average of various electrical driver currents at multiple time points in a predefined time interval. In other examples, instead of power-reduction criterion that specifies reduction of an average electrical driver current, the power-reduction criterion can specify reduction of another type of aggregate electrical driver current from the signal driver, such as a maximum electrical driver current from among electrical driver currents at various time points in a predefined time interval, a median electrical driver current from among electrical driver currents at various time points in a predefined time interval, a weighted sum of electrical driver currents at various time points in a predefined time interval, and so forth.

The encoding that is applied on transmission data according to a power-reduction criterion that specifies a reduction of an aggregate electrical driver current from the signal driver can improve the reliability and/or lifetime of an optical transmitter, and reduce the operating temperature of the optical transmitter (which can allow the optical transmitter to perform electrical-to-optical conversion at a higher rate).

Reducing the aggregate electrical driver current at the signal driver associated with the optical transmitter also can lead to an operating point of an optical receiver that corresponds to the reduced aggregate electrical driver current. This allows the optical receiver to detect optical data signals (transmitted by the optical transmitter) reliably at a target data rate, but at an operating point corresponding to a reduced aggregate electrical driver current. As a result, the reliability and/or lifetime of the optical receiver can also be improved using mechanisms or techniques according to some implementations.

FIG. 1 is a block diagram of an example arrangement of components that can be employed in an electronic device. The components of FIG. 1 include an optical transmitter 102 that is used for transmitting optical signals over an optical link 104, which can be an optical fiber, an optical waveguide, and so forth.

The optical transmitter 102 is activated or deactivated based on an electrical driver current output by an electrical signal driver 106. In some examples, the signal driver 106 can include a serializer (to serialize data into a sequence of data bits that are to be communicated by the optical transmitter). The signal driver 106 can also include a driver amplifier that amplifies a signal corresponding to a data bit to produce the electrical driver current that is output to the optical transmitter 102.

The signal driver 106 receives encoded data 108 from a power-reduction encoder 110 according to some implementations. The power-reduction encoder 110 receives transmission data 112, which is the original data (or raw data) that is to be transmitted to a receiving device.

The power-reduction encoder 110 encodes the transmission data 112 using a power-reduction criterion that specifies a reduction of an aggregate electrical driver current of the signal driver 106. The transmission data 112 includes a collection of data bits. The power-reduction encoder 110 analyzes the states (e.g. active state or inactive state) of the data bits in the collection, and determines whether the collection of data bits violates or meets the power-reduction criterion. In response to the collection of data bits violating the power-reduction criterion, the power-reduction encoder 110 applies encoding on the transmission data 112 that changes at least one of the data bits to form the data bits of the encoded data 108.

In some implementations, the power-reduction criterion that specifies a reduction of the aggregate electrical driver current of the signal driver 106 seeks to reduce a number of active data bits in the encoded data 108 as compared to the transmission data 112. In binary terms, an active data bit is considered to have a value "1," while an inactive data bit is considered to have a value "0." An active data bit causes the signal driver 106 to output an electrical driver current that causes activation of the optical transmitter 102 (such that the optical transmitter 102 transmits a corresponding optical signal over the optical link 104). In some examples, in response to an active data bit at the input of the signal driver 106, the signal driver 106 produces an electrical driver current that is greater than a predefined threshold associated with the optical transmitter 102, which causes the optical transmitter 102 to transmit the corresponding optical signal.

On the other hand, an inactive data bit received by the signal driver 106 causes the signal driver 106 to output no electrical current, or alternatively, to output an electrical driver current that is less than the predefined threshold. As a result, the optical transmitter 102 does not transmit an optical signal. Thus, an inactive data bit leads to the optical transmitter 102 being effectively in an off or deactivated state.

The power-reduction encoder 110 can analyze the data bits of the transmission data 112, and according to the power-reduction criterion, applies encoding to reduce the number of active data bits to form the encoded data 108. In some implementations, the encoding can involve inverting the data bits of the transmission data 112 to form the encoded data 108.

FIG. 2 shows an example of transmission data 112 and corresponding encoded data 108 produced by the power-reduction encoder 110 according to the power-reduction criterion discussed above. The transmission data 112 has the following collection (e.g. sequence) of data bits: 11111011. Note that the transmission data 112 has a much larger number of active ("1") data bits than inactive ("0") data bits. Operating the signal driver 106 using the transmission data 112 (without first performing encoding using the power-reduction criterion) leads to a higher average electrical driver current of the signal driver 106, and thus can lead to reduced reliability and/or lifetime of the optical transmitter 102, and increased operating temperature of the optical transmitter 102.

In accordance with some implementations, the power-reduction criterion used by the power-reduction encoder 110 applies encoding to reduce the number of active data bits in the encoded data 108. According to the example of FIG. 2, the encoding involves inverting the data bits in the collection forming the transmission data 112, to produce the following collection (e.g. sequence) of data bits: 00000100. Note that the encoded data 108 in the example of FIG. 2 has a larger number of inactive data bits as compared to active data bits, which would lead to a reduction in the average electrical driver current of the signal driver 106.

Note that in some cases, the power-reduction encoder 110 does not apply inversion of the data bits of the transmission data 112. This can be the case where the transmission data 112 already satisfies the power-reduction criterion, namely that the number of active data bits in the transmission data 112 is less than the number of inactive data bits.

The "encoded data" output by the power-reduction encoder 110 can thus either be data that has been changed with respect to the transmission data 112 (in cases where the transmission data 112 does not satisfy the power-reduction criterion), or alternatively, can include an un-modified form of the transmission data 112 (in cases where the transmission data satisfies the power-reduction criterion).

An example data packet 300 that can be communicated over the optical link 104 is shown in FIG. 3. A "packet" can refer to any predefined collection of data bits. In the FIG. 3 example, the packet 300 has a polarity indicator 302, and a data section 304. The data section 304 includes the data that is to be applied to the signal driver 106. In the context of FIG. 1, the data section 304 can include the encoded data 108.

In some examples, the polarity indicator 302 can be a polarity bit that is settable to a "0" or "1" value. In other examples, the polarity indicator 302 can have more than one bit. A first value of the polarity indicator 302 indicates that the data in the data section 304 is inverted with respect to the transmission data 112. A second value of the polarity indicator 302 indicates that the data in the data section 304 of the packet 300 is not inverted with respect to the transmission data 112 (in other words, the data section 304 contains the original transmission data 112).

FIG. 4 is a block diagram of an example arrangement that includes a sending device 400 and a receiving device 402 that are interconnected by the optical link 104. Components in the sending device 400 that are the same as corresponding components in FIG. 1 are assigned the same reference numerals. In FIG. 4, the sending device 400 includes the power-reduction encoder 110, the signal driver 106, and the optical transmitter 102. Logic 401 (e.g. a processor, an I/O device, etc.) in the sending device 400 provides the transmission data 112 to the power-reduction encoder 110.

In addition, the sending device 400 includes a clock generator 404, which outputs a clock signal that is provided to the signal driver 106. The clock signal is used to control the circuitry of the signal driver 106. The clock signal has a predetermined clock frequency.

Optical signals are transmitted by the optical transmitter 102 over the optical link 104. These optical signals can contain the content of the receive packet 300 of FIG. 3. The optical signals are received by an optical receiver 406 in the receiving device 402. The optical receiver 406 can include a photo diode or other type of photo detector. The optical receiver 406 converts the received optical signals into electrical signals, which are provided to a receive circuit 408. The receive circuit 408 includes a clock and data recovery module 410, which can recover the data communicated in the optical signals, as well as an embedded clock signal that is derived from transitions in the incoming data bits. The embedded clock signal recovered from the transitions in the incoming data bits is used to clock the receive circuit 408. The receive circuit 408 also includes a deserializer to convert a serial stream of data bits into parallel data, which is output from the receive circuit 408.

The recovered data bits form a collection of data bits (referred to as "encoded data 412") that correspond to the encoded data 108 at the sending device 400. The encoded data 412 output by the receive circuit 408 is provided to a decoder 414, which applies decoding on the encoded data 412 that is the reverse of the encoding applied by the power-reduction encoder 110 of the sending device 400. The decoder 414 can perform decoding based on the polarity indicator 302 in the received packet 300 (FIG. 3), for example.

In some examples, if the polarity indicator 302 in the receive packet 300 has a first value, then the decoder 414 inverts the encoded data 412. On the other hand, if the polarity indicator 302 in the receive packet 300 has a second value, then the decoder 414 does not apply inversion on the encoded data 412. After the decoding, the decoder 414 outputs received data 416, which can be used by logic 418 in the receiving device 402.

Note that the sending device 400 can also include receive components similar to the optical receiver 406, receive circuit 308, and decoder 314 of the receiving device 402. Similarly, the receiving device 402 can include transmission components similar to the power-reduction encoder 110, signal driver 106, and optical transmitter 102.

Figure 5:
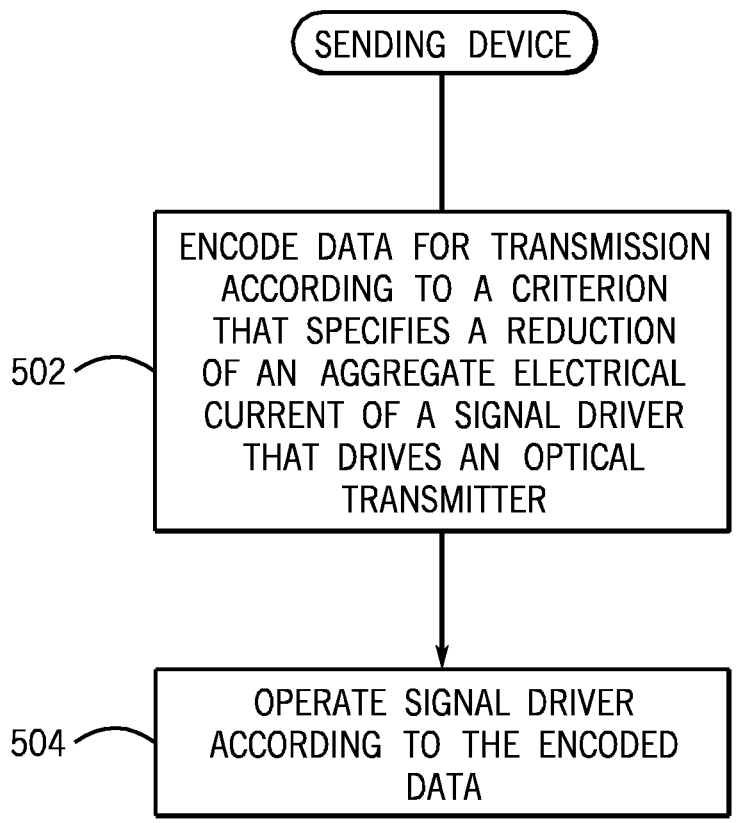
FIGS. 5 and 6 are flow diagrams of power management processes of a sending device, according to various implementations.

FIG. 5 is a flow diagram of a process performed by a device according to some implementations, such as the electronic device of FIG. 1 or the sending device 400 of FIG. 4, for example. The power-reduction encoder 110 in the device encodes (at 502) data for a transmission by the optical transmitter 102. As noted above, the encoding is according to a power-reduction criterion that specifies a reduction of an aggregate electrical driver current of the signal driver. The encoding converts the data for transmission into encoded data that is different from the data for transmission.

The signal driver 106 is then operated (at 504) according to the encoded data. Operation of the signal driver 106 according to the encoded data causes electrical driver currents to be output by the signal driver 106 that correspond to the encoded data bits, which in turn causes the optical transmitter 102 to communicate optical signals according to the corresponding electrical driver currents from the signal driver 106.

Figure 6:
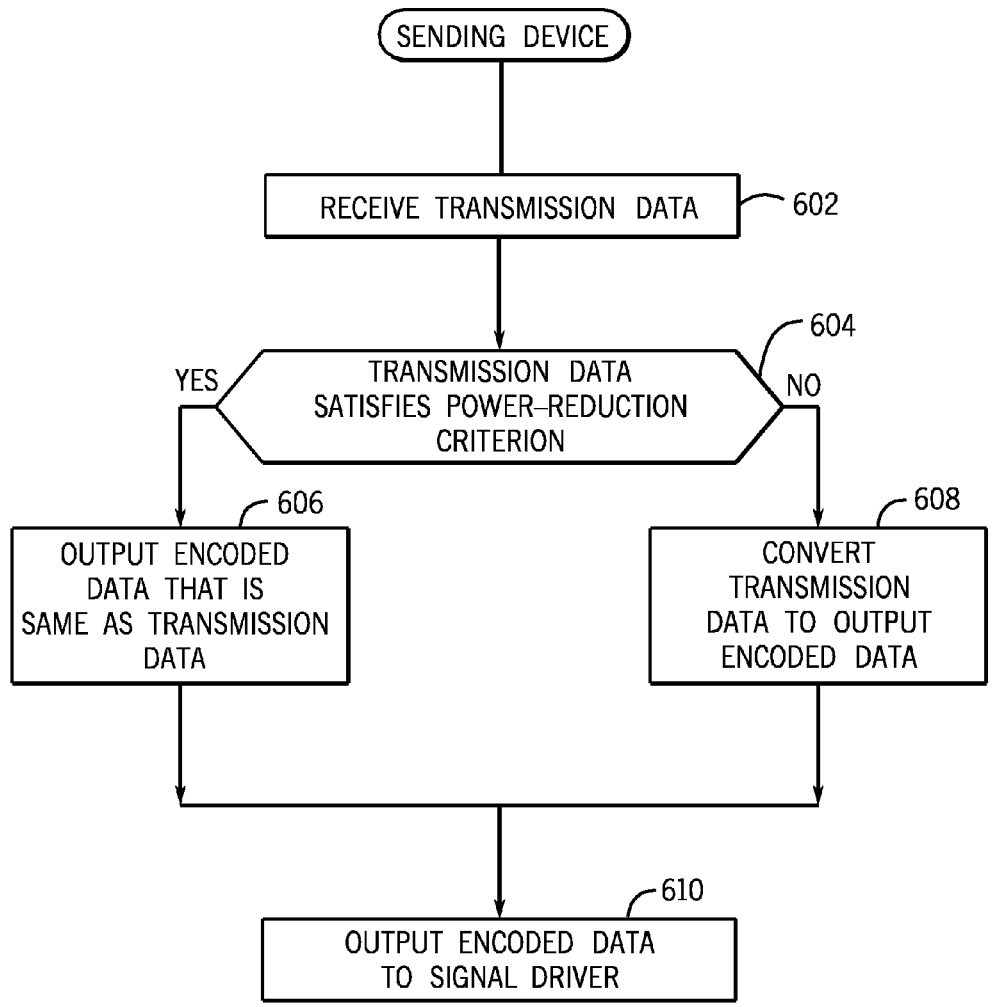

FIG. 6 is a flow diagram of a process according to further implementations, which can also be performed by the electronic device of FIG. 1 or the sending device 400 of FIG. 4, for example. The power-reduction encoder 110 receives (at 602) transmission data, which is to be transmitted by the optical transmitter 102. The power-reduction encoder 110 checks (at 604) the transmission data to determine whether the transmission data satisfies the power-reduction criterion. If the transmission data already satisfies the power-reduction criterion, then the power-reduction encoder 110 does not change the transmission data. In this case, the encoded data output (at 606) from the power-reduction encoder 110 is the same as the transmission data. On the other hand, if the transmission data does not satisfy the power-reduction criterion, then the power-reduction encoder 110 applies (at 608) encoding to convert the transmission data into encoded data that is different from the transmission data. For example, the encoding can involve inverting the data bits of the transmission data to form the data bits of the encoded data.

The encoded data is then output (at 610) to the signal driver 106 to cause the signal driver 106 to provide corresponding electrical driver currents for operating the optical transmitter 102.

Figure 7:
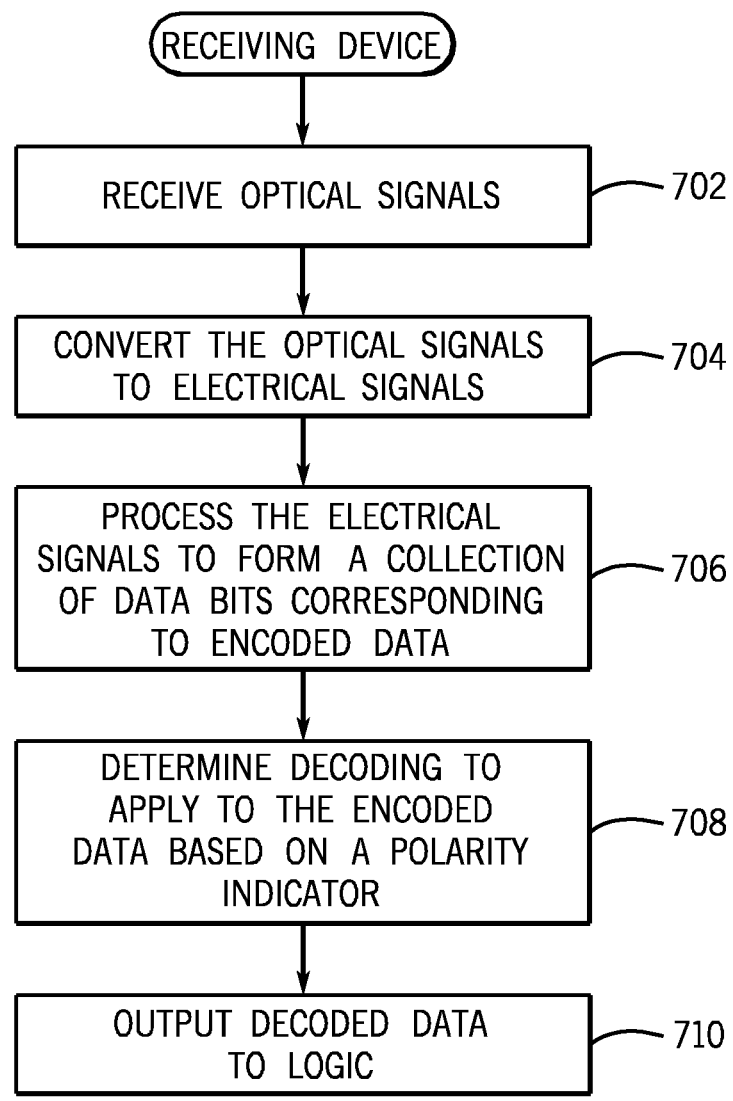
FIG. 7 is a flow diagram of a process of a receiving device, according to some implementations.

FIG. 7 is a flow diagram of a process performed by a receiving device, such as the receiving device 402 in FIG. 4. The receiving device receives (at 702) optical signals transmitted by a sending device, such as the sending device 400. The optical receiver 406 converts (at 704) the received optical signals into electrical signals, which are processed (at 706) by the receive circuit 408 to form a collection of data bits that is output by the receive circuit 408 as encoded data 412 (FIG. 4). The encoded data 412 may have been transmitted as part of a packet (e.g. packet 300 in FIG. 3) that includes a polarity indicator 302. The decoder 414 in the receiving device 402 uses the polarity indicator 402 to determine the decoding to apply (at 708) to the encoded data 412 output by the receive circuit 408. The decoded data is then output (at 710) to the logic 418 of the receiving device 402.

In addition to encoding that involves inversion of data bits according to a power-reduction criterion as discussed above, the power-reduction encoder 110 can further apply other power reduction mechanisms or techniques. For example, the power-reduction encoder 110 can determine whether the transmission data 112 constitutes idle data (e.g. an idle packet). Idle data refers to garbage data that does not actually reflect any data that is to be transmitted. The garbage data can be transmitted by a sending device to achieve clock synchronization between the transmitter in the sending device 400 and the receiver in the receiving device 402, for example. To achieve power reduction, the power-reduction encoder 110 can produce an encoded idle packet that includes mostly inactive data bits, where the encoded idle packet has a relatively small number of active data bits to provide the data bit transitions that are used by the receiving device 402 to recover an embedded clock signal. For example, an encoded idle packet can be produced as follows: provide an active bit for every specified number of inactive data bits, where the specified number is greater than or equal to 2. The idle packet has a larger number of inactive data bits than active data bits.

In further implementations, when the sending device 400 is in an idle state for a relatively long period of time (where no data transmission is occurring), the sending device 400 can cause the signal driver 106 to turn off its output current such that the optical transmitter 102 is deactivated. In some examples, the sending device 400 can determine that an idle period of greater than some predefined time interval triggers the powering off of the optical transmitter 102, which leads to greater power savings.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
encoding data for transmission by an optical transmitter that is driven by a signal driver, where the encoding includes inverting the data for transmission into inverted data that is different from the data for transmission, the encoding is according to a criterion that specifies a reduction of an aggregate electrical current of the signal driver, and the encoding includes setting an indicator to indicate that the inverting has been applied;
operating the signal driver according to the encoded data to produce an output electrical current by the signal driver;
optically transmitting, by the optical transmitter according to the output electrical current, a packet containing the inverted data over an optical fiber, the packet containing the set indicator;
detecting an idle packet;
encoding the idle packet to produce an encoded idle packet, the encoded idle packet including inactive data bits and at least an active data bit to provide a data bit transition between an inactive data bit and the active data bit, wherein a number of inactive data bits exceeds a number of the at least one active data bit in the encoded idle packet; and
sending, by the optical transmitter, the encoded idle packet to cause synchronization of the optical transmitter with a receiver of the encoded idle packet.

2. The method of claim 1, wherein the data for transmission includes a collection of data bits, and wherein the inverting changes at least one of the data bits to form the inverted data.

3. The method of claim 2, wherein the inverting forms the inverted data that has a number of active data bits that is less than a number of active data bits in the data for transmission.

4. The method of claim 1, further comprising:
receiving second data for transmission;
in response to determining that the second data for transmission satisfies the criterion, deciding to not invert the second data for transmission; and
operating the signal driver according to the second data for transmission to cause optical transmission of the second data for transmission.

5. The method of claim 1, wherein the optical transmitter includes a semiconductor laser diode.

6. The method of claim 1, wherein the criterion causes a reduction of an average electrical current of the signal driver within a time interval.

7. An apparatus comprising:
an optical transmitter;
a signal driver to drive the optical transmitter; and
an encoder to encode data for transmission by the optical transmitter, to produce encoded data output to the signal driver, wherein the encoding is according to a criterion that specifies that a number of active data bits in the encoded data is less than a number of active data bits in the data for transmission, the encoding includes inverting the data for transmission into inverted data, and the encoding includes setting an indicator to indicate that the inverting has been applied,
wherein the signal driver is responsive to the inverted data to drive the optical transmitter to optically transmit a packet containing the inverted data over an optical fiber, the packet containing the set indicator,
wherein the encoder is to further:
detect an idle packet; and
encode the idle packet to produce an encoded idle packet, the encoded idle packet including inactive data bits and at least an active data bit to provide a data bit transition between an inactive data bit and the active data bit, wherein a number of inactive data bits exceeds a number of the at least one active data bit in the encoded idle packet, and
wherein the optical transmitter is to send the encoded idle packet to cause synchronization of the optical transmitter with a receiver of the encoded idle packet.

8. The apparatus of claim 7, wherein the signal driver is to output a first signal to cause active operation of the optical transmitter, in response to an active data bit of the inverted data, and
wherein the signal driver is to provide another output to cause deactivation of the optical transmitter, in response to an inactive data bit of the inverted data.

9. The apparatus of claim 7, wherein the encoder is configured to decide not to invert further data in response to the further data satisfying the criterion.

10. The apparatus of claim 9, wherein the indicator is set to a first value to indicate that the packet contains the inverted data, and wherein a second packet containing the indicator set to a second value indicates that the second packet contains the further data that is un-modified from corresponding data for transmission.

11. The apparatus of claim 7, wherein the optical transmitter includes a vertical-cavity surface-emitting laser.

12. An apparatus comprising:
an optical receiver to receive an optical signal over an optical fiber from a sending device;
a receive circuit to receive an electrical signal output from the optical receiver in response to the received optical signal; and
a decoder to decode a data packet produced by the receive circuit in response to the electrical signal, wherein the decoder is to apply a decoding that corresponds to encoding applied at the sending device, where the encoding is according to a criterion that specifies a reduction of an aggregate electrical current of a signal driver that drives an optical transmitter of the sending device, and wherein the decoder is to detect whether the data packet contains an indicator set to a value that indicates that data carried in the data packet has been inverted by the encoder, and the decoder is to invert the data carried in the data packet in response to detecting the indicator set to the value,
wherein the receive circuit is to further receive an encoded idle packet encoded by the sending device, the encoded idle packet including inactive data bits and at least an active data bit to provide a data bit transition between an inactive data bit and the active data bit, wherein a number of inactive data bits exceeds a number of the at least one active data bit in the encoded idle packet, and wherein receipt of the encoded idle packet is to cause synchronization of the optical receiver with an optical transmitter of the sending device that sent the encoded idle packet.

13. The system of claim 12, wherein the decoder is to decide not to invert the data in the data packet in response to the indicator set to a second value indicating that the data in the data packet was not inverted by the encoder.

14. The system of claim 12, wherein the criterion specifies that a number of active data bits in encoded data produced by the encoding is less than a number of active data bits in original transmission data for transmission by the sending device.

* * * * *